United States Patent [19]

Matthes

[11] 4,342,300

[45] Aug. 3, 1982

[54] STRATIFIED CHARGE ENGINE WITH CHARGE PREPARATION MEANS

[75] Inventor: William R. Matthes, Troy, Mich.

[73] Assignee: General Motors Corporation, Detroit, Mich.

[21] Appl. No.: 238,379

[22] Filed: Feb. 26, 1981

[51] Int. Cl.³ .................. F02B 17/00; F02M 25/06
[52] U.S. Cl. .................................. 123/430; 123/432; 123/557; 123/568
[58] Field of Search ............... 123/250, 251, 252, 255, 123/292, 143 A, 143 B, 557, 59 EC, 568, 557, 429, 308, 26, 430

[56] References Cited

U.S. PATENT DOCUMENTS

| | | |
|---|---|---|
| 887,703 | 5/1908 | Sharpneck .......................... 123/292 |
| 1,520,772 | 12/1924 | Ricardo .......................... 123/143 B |
| 3,785,355 | 1/1974 | Toepel . |
| 3,809,030 | 5/1974 | Moiroux .......................... 123/292 X |
| 4,210,105 | 7/1980 | Nohira et al. . |
| 4,230,073 | 10/1980 | Nohira et al. . |
| 4,246,873 | 1/1981 | Lih-Liaw . |

FOREIGN PATENT DOCUMENTS 2575 of 1908 United Kingdom ................ 123/292
708807 5/1954 United Kingdom ................ 123/292

*Primary Examiner*—Tony M. Argenbright
*Attorney, Agent, or Firm*—Robert J. Outland

[57] ABSTRACT

Disclosed is a stratified charge internal combustion engine having a charge preparation chamber centrally disposed at the end of each cylinder and means for direct fuel injection into the preparation chamber. A valved opening connects the charge preparation chamber with a charge admission portion of a combustion chamber having the usual intake, exhaust and spark-ignition means. In operation, the charge chamber valve is opened twice each cycle, once during a high-pressure portion of the expansion stroke to receive a charge of pressurized hot gas, after which fuel is discharged into the charge chamber to be vaporized by and mixed with the hot gas. The charge chamber valve is subsequently opened during a portion of the subsequent compression stroke so that the premixed charge is forced at high pressure into the combustion chamber for further mixing and the creation of a localized cloud of air-fuel mixture and combustion gases which is subsequently ignited by the spark.

3 Claims, 2 Drawing Figures (1)

STRATIFIED CHARGE ENGINE WITH CHARGE PREPARATION MEANS

TECHNICAL FIELD

The invention relates to internal combustion engines and more particularly to stratified charge preparation means including a valved charge preparation chamber adjacent a combustion chamber.

BACKGROUND

Numerous means have been proposed for providing a stratified charge of air-fuel mixture for ease of ignition and burning in the combustion chamber of an internal combustion engine. Such arrangements have aimed with some success to provide more efficient engine operation, especially under part-load conditions than has been achieved by engines of the homogeneous premixed charge type.

For various reasons however, the performance of stratified charge engines has, in general, been less than ideal. Among the reasons in some cases is the inadequate mixing of air and fuel before ignition caused by relatively late injection of a fuel charge. Problems have also been encountered in providing for adequate atomization of an injected fuel without destroying containment of the fuel in a stratified fuel-air mixture cloud.

SUMMARY OF INVENTION

The present invention provides a stratified charge engine with means for increasing the available time for vaporization of fuel before combustion and for aiding fuel atomization through the use of in-cylinder exhaust gas.

In accordance with the invention, a small charge preparation chamber is located in the cylinder head, preferably at a central location. This charge chamber communicates with the combustion chamber by means of a small opening controlled by a charge preparation poppet valve actuated by suitable mechanical or electrical means. Fuel is injected into the charge chamber by suitable fuel injection means which may be pressure or electrically actuated. The valved opening or orifice connecting the charge chamber with the combustion chamber is preferably shaped to direct a prepared charge into a central charge admission portion of the combustion chamber.

The charge poppet valve is timed to open briefly during the piston expansion stroke to receive a high-pressure charge of hot gas from the combustion chamber. After the valve closes, a fuel charge is injected into the charge preparation chamber for mixing with and vaporization by the hot high-pressure gas retained therein. During the following compression stroke of the cylinder cycle, the charge poppet valve is opened briefly to discharge the pressurized fuel-gas mixture into the combustion chamber. The force of discharge through the shaped orifice causes localized mixing and formation of a combustible stratified mixture cloud within the charge admission portion of the combustion chamber adjacent the spark plug which ignites the stratified charge after closing of the charge preparation poppet valve.

Further features and advantages of the invention will be more fully understood from the following description of a preferred embodiment taken together with the accompanying drawing.

DISCLOSURE OF THE ILLUSTRATED EMBODIMENT

Figure 1:
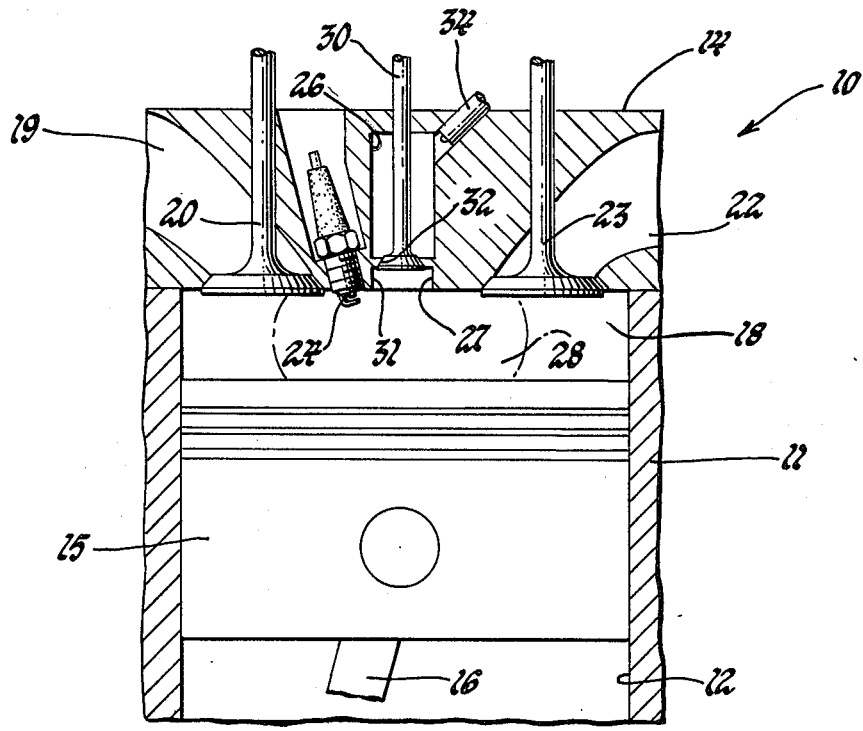
FIG. 1 is a representational cross-sectional view of a portion of one cylinder of a stratified charge internal combustion engine having means formed in accordance with the invention.

Referring now to the drawing in detail, numeral 10 generally indicates an internal combustion engine having the usual cylinder block 11 defining a cylinder 12. A cylinder head 14 is mounted on top of the cylinder block 11 closing the top end of the cylinder 12 which is open at its lower end. A piston 15 is reciprocably disposed within the cylinder 12 and is connected by connecting rod 16 in conventional fashion with the engine crankshaft, now shown.

At the closed end of the cylinder, a combustion chamber 18 is formed between the piston and the cylinder head. Within the cylinder head, an intake port 19 controlled by an intake valve 20 provides for the admission of air or air-fuel mixture to the combustion chamber while an exhaust port 22 controlled by an exhaust valve 23 permits the exhaust of combustion products therefrom. The cylinder head further carries a spark plug 24 extending into the combustion chamber near the center of the cylinder.

In the cylinder head on the axis of the cylinder, there is disposed a small charge preparation chamber 26. Chamber 26 communicates through an opening or orifice 27 with a central charge admission portion 28 of the combustion chamber 18. A charge preparation poppet valve 30 is adapted to open or close the opening 27 so as to control communication of the charge preparation chamber with the combustion chamber.

The opening 27 is preferably shaped, such as with a cylindrical outlet portion 31 on the combustion chamber side of the valve seat 32, so as to direct the flow of gas discharged through the opening 27 into the central charge admission portion 28 of the combustion chamber. A fuel injector 34 is also mounted in the cylinder head and is located so as to inject fuel directly into the charge preparation chamber 26 at a predetermined desired point in the engine cylinder cycle.

Suitable means, not shown, are provided for actuating the intake valve 20, exhaust valve 23, spark plug 24, charge poppet valve 30 and injector 34 in a manner to be subsequently disclosed. Such means may include, for example, conventional mechanical means for actuating the inlet and exhaust valves, mechanical, electrical or other suitable means for actuating the charge poppet valve 30 and injector 34 and electrical means for creating a spark at the spark plug gap which extends within the charge admission portion of the combustion chamber.

Figure 2:
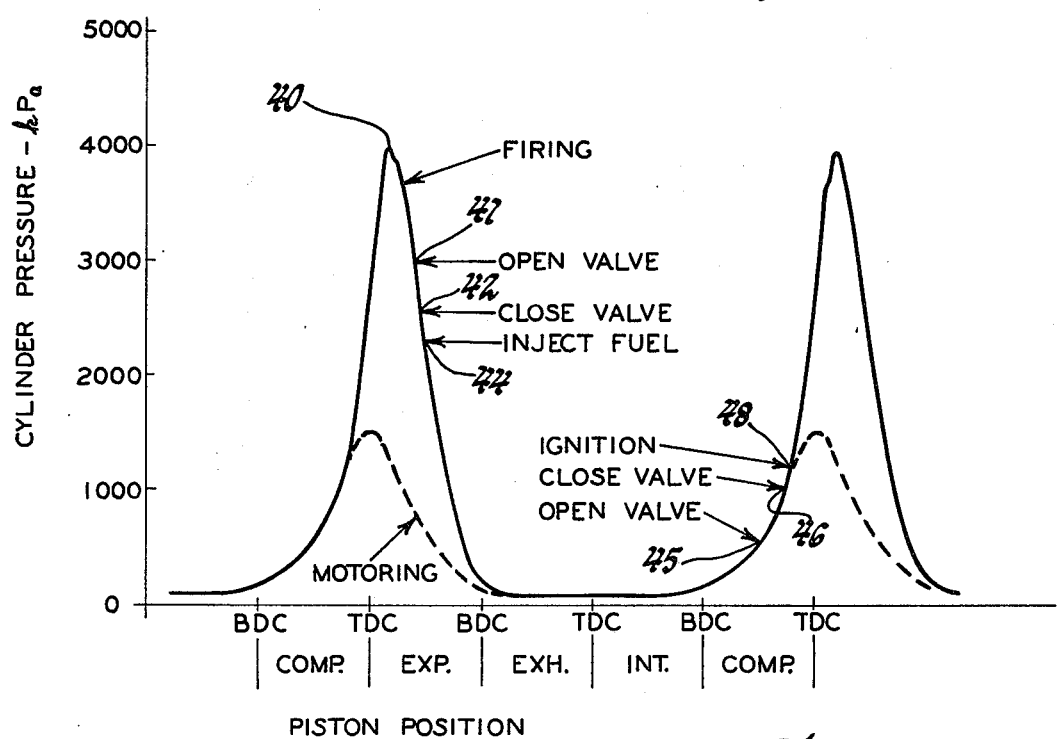
FIG. 2 is a graphical representation of the pressure conditions in the main combustion chamber during portions of the engine cycle indicating the manner of operation of the engine and the associated charge preparation poppet valve.

Operation of the engine of FIG. 1 in accordance with the invention is best explained by reference to FIG. 2 which illustrates graphically various operating steps and their relation to cylinder pressures during the various events of a cylinder operating cycle which includes compression, expansion, exhaust and intake strokes of the piston.

Beginning our description of a cycle at the top dead center position of the piston which concludes a compression stroke, it will be understood that a previous charge has been ignited and is burning to raise the cylinder pressure to a peak of around 4,000 kPa as indicated at numeral 40. Subsequently during the expansion stroke, the charge valve 30 is opened at 41 allowing the charge preparation chamber 26 to be filled with a portion of the high-pressure gas then existing in the combustion chamber. Shortly thereafter still on the expansion stroke, the charge valve 30 is closed at 42. Immediately thereafter at 44, the fuel injector 34 injects a charge of fuel into the hot gases retained within the charge preparation chamber 26.

The injected fuel, heated by the hot gases, quickly vaporizes and mixes with the pressurized gas in the charge chamber 26. Such mixing goes on while the cylinder completes its expansion stroke and continues through the exhaust and intake strokes of the piston, which discharge from the combustion chamber the burned gases from the previous cycle and introduce to the combustion chamber a new charge of air or air-fuel mixture on the next cycle.

During the subsequent compression stroke, the charge valve 30 is again opened at 45 for a short interval extending to 46, during which time the prepared, premixed charge of fuel and pressurized gas then existing in the charge chamber 26 is discharged through the opening 27 into the combustion chamber 18. The shaping of opening 27 with its cylindrical outlet 31 directs the discharge of the prepared charge into the central charge admission portion 28 of the combustion chamber where it mixes locally with the air in the central portion of the chamber and forms a stratified mixture cloud within the admission portion 28 surrounding the spark plug.

Subsequently at point 48, nearing the end of the compression stroke, a spark is created by the spark plug, igniting the stratified charge and causing combustion to again raise the cylinder pressure to its peak as in the previously described cycle. The described steps are then repeated continuing the cycles of engine operation.

In operating the engine in the manner described, it is preferred that the stratified charge be formed by admitting pure air through the intake passage 19 into the combustion chamber and by providing all of the fuel required for engine operation through the injector 34 by way of the charge chamber 26. It is, however, within the scope of the invention to provide a part of the fuel for engine operation, especially during periods of high load, by admitting a mixture of air and fuel through the intake port 19, which may be a relatively lean mixture not capable of being easily ignited. Additional fuel would then be injected through the injector 34 to form, by way of the charge chamber 26, a relatively richer mixture in the charge admission portion 28 of the combustion chamber upon discharge of the pressurized gas from the charge chamber 26.

While the invention has been disclosed by reference to a preferred embodiment chosen for purposes of illustration, it should be understood that numerous changes could be made within the scope of the inventive concepts described. Accordingly, it is intended that the invention not be limited to the illustrated embodiment but that it have the full scope permitted by the language of the following claims.

The embodiments of the invention in which an exclusive property or privilege is claimed are defined as follows:

1. A stratified charge internal combustion engine comprising:

means defining a closed end cylinder having a piston reciprocable in the cylinder and defining with the closed end thereof a variable volume combustion chamber, inlet and exhaust means communicating with said combustion chamber through said cylinder defining means including means for controlling the admission of air to and the exhaust of spent gases from said chamber upon reciprocating motion of said piston through a cycle of sequential intake compression, expansion and exhaust strokes, a fixed volume charge preparation chamber outside said cylinder adjacent said combustion chamber and communicating therewith through an opening adjacent a selected charge admission portion of said combustion chamber to provide a stratified charge of combustible fuel-air mixture in said portion, spart ignition means in said combustion chamber charge admission portion and operative to ignite the combustible mixture in said combustion chamber, valve means associated with said charge preparation chamber to close and open said opening to the combustion chamber, said valve means being operative to open and close during the expansion stroke to receive a charge of pressurized gas from the combustion chamber and trap it for preparation in the charge preparation chamber and further operative to open and close during the compression stroke to discharge a prepared charge into said combustion chamber charge admission portion, and fuel injection means discharging into the charge preparation chamber and operative to deliver a charge of fuel into the trapped gas charge upon its retention for mixing therewith to form said prepared charge during the major portions of each cycle including the piston exhaust and intake strokes and portions of the power and compression strokes, whereby an extended time for vaporizing and mixing of the fuel and gas charge in the charge preparation chamber is provided before formation of the stratified charge in the combustion chamber.

2. The engine of claim 1 wherein said opening includes shaped edge portions operative to direct the flow of the prepared charge into the selected charge admission portion of the combustion chamber so as to form the stratified charge therein.

3. The engine of claim 1 wherein said opening is disposed near the center of the closed end of said cylinder and arranged to direct said stratified charge to a charge admission portion in the center of said combustion chamber.

* * * * *

UNITED STATES PATENT AND TRADEMARK OFFICE
CERTIFICATE OF CORRECTION

PATENT NO. : 4,342,300
DATED : August 3, 1982
INVENTOR(S) : William R. Matthes

It is certified that error appears in the above-identified patent and that said Letters Patent are hereby corrected as shown below:

[56] References Cited, Foreign Patent Documents, "of 1908" should read -- 2/1908 --.

Col. 2, line 24, "now" should read -- not --.

Col. 4, line 27, "spart" should read -- spark --.

Signed and Sealed this

Twenth-eighth Day of September 1982

[SEAL]

Attest:

Attesting Officer

GERALD J. MOSSINGHOFF

Commissioner of Patents and Trademarks